March 24, 1942.  J. R. YANCEY  2,277,380
APPARATUS FOR PRODUCING WELLS
Filed Nov. 30, 1939  6 Sheets-Sheet 2
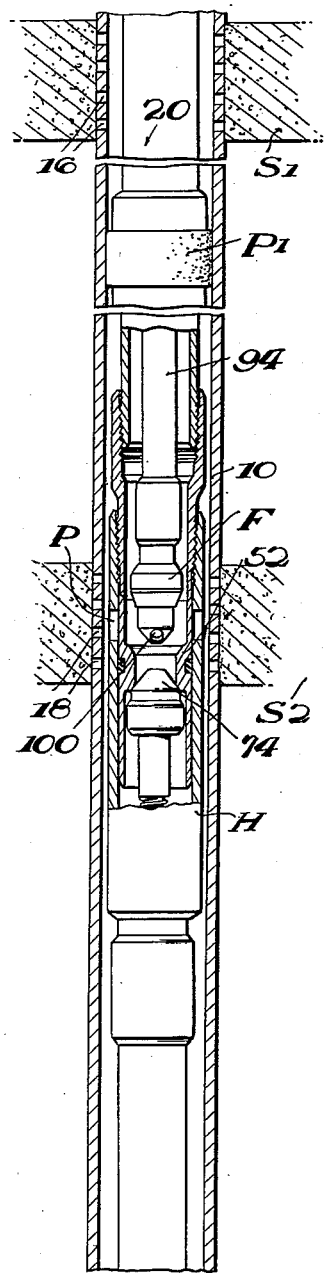
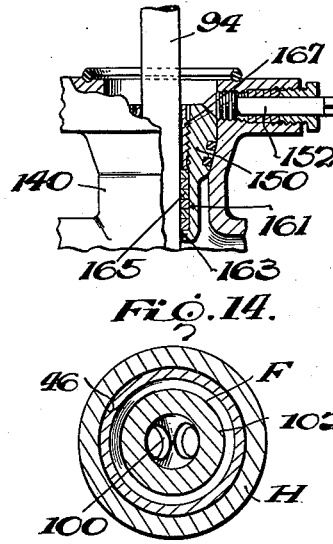
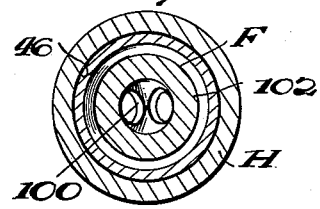
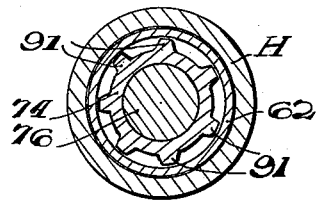
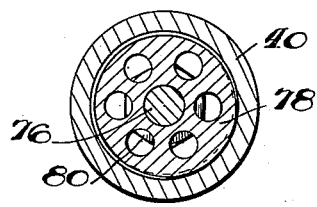
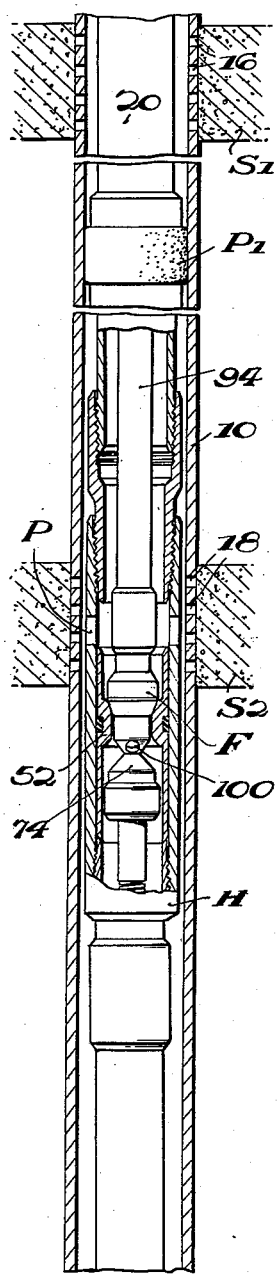
Inventor
John R. Yancey,
By Cushman Darby & Cushman
Attorneys

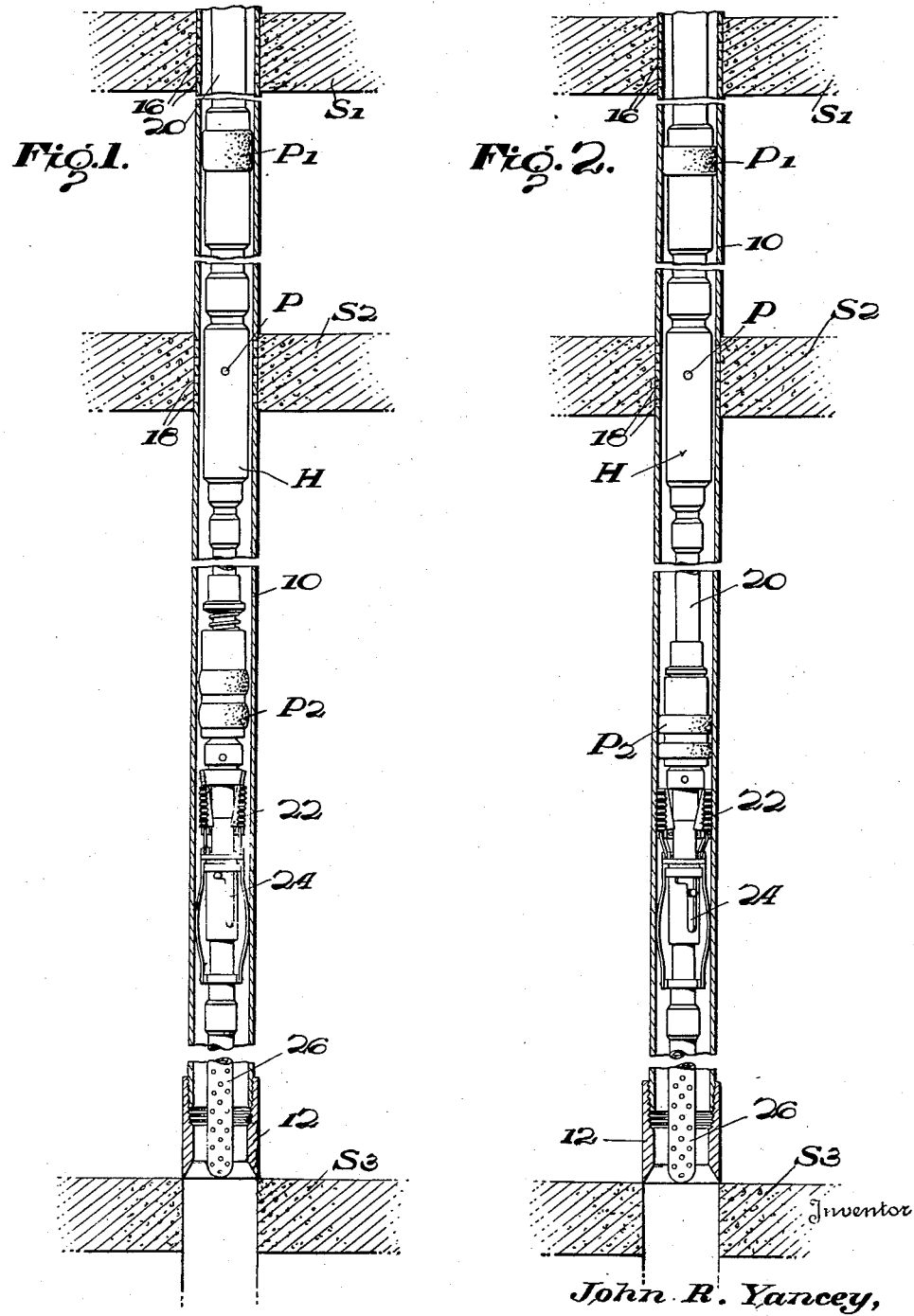

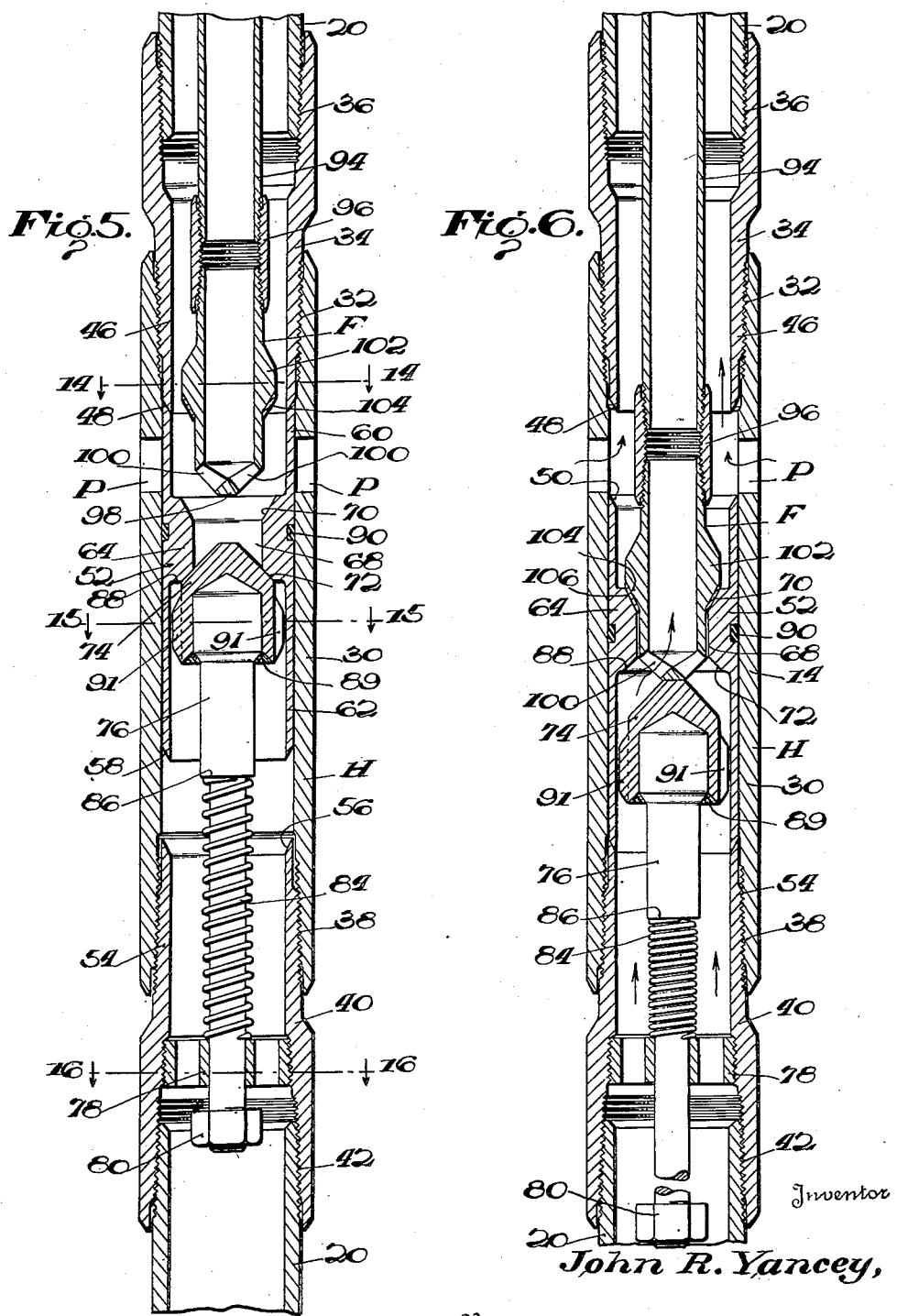

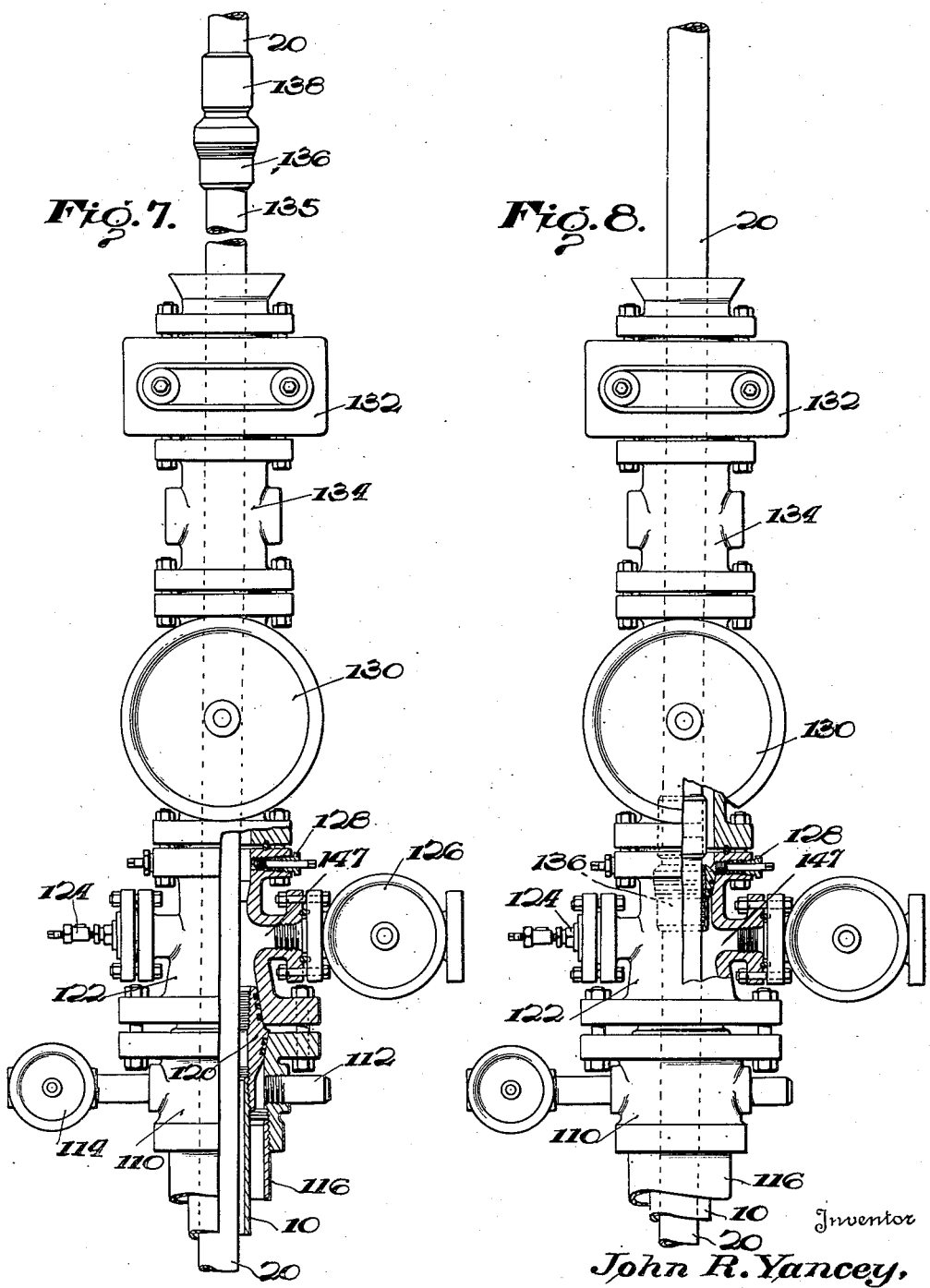

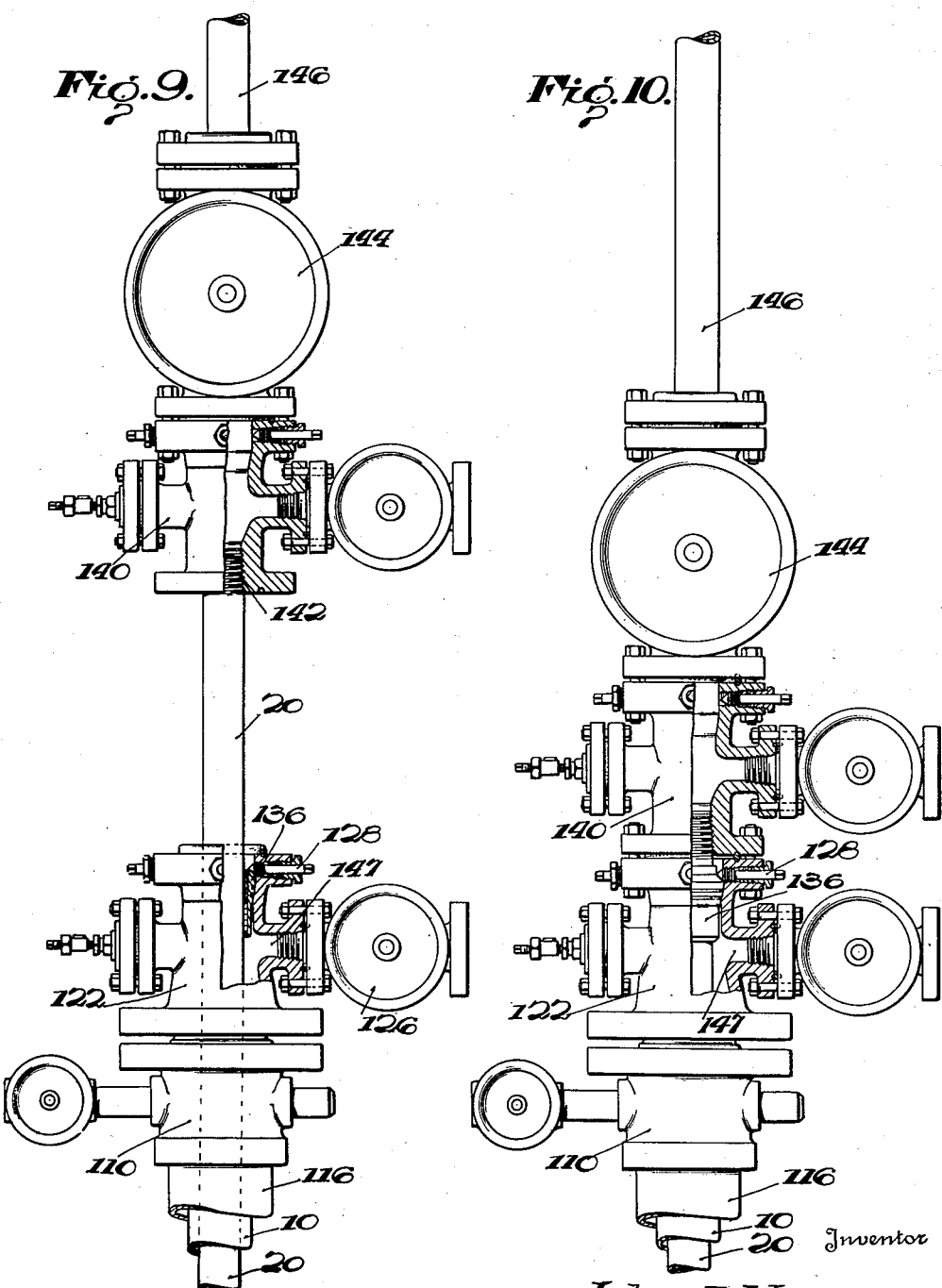

March 24, 1942. J. R. YANCEY 2,277,380
APPARATUS FOR PRODUCING WELLS
Filed Nov. 30, 1939 6 Sheets-Sheet 6
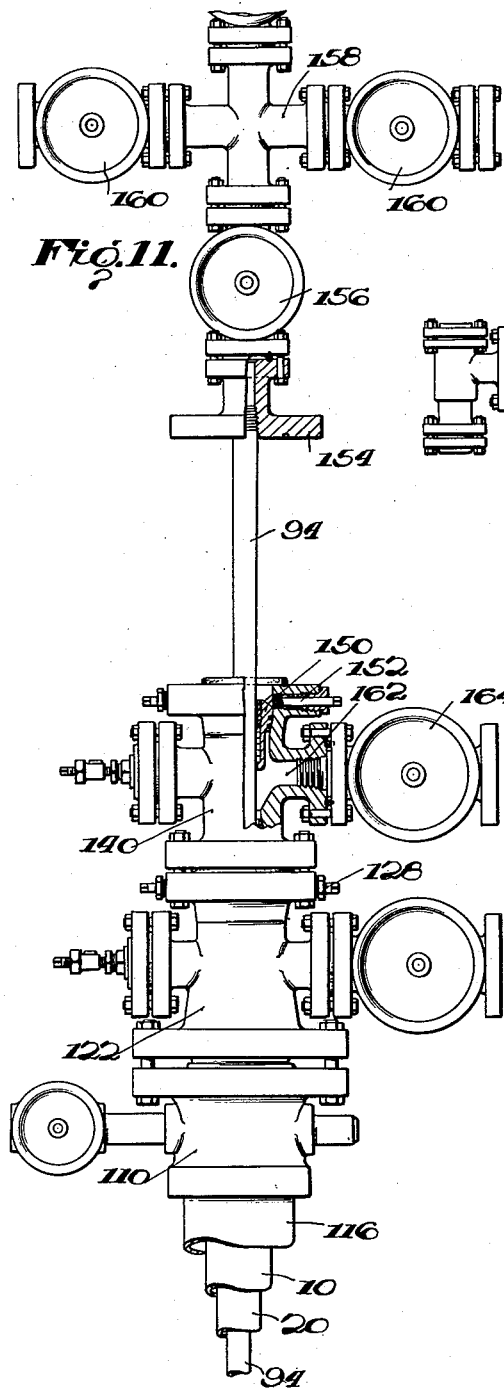
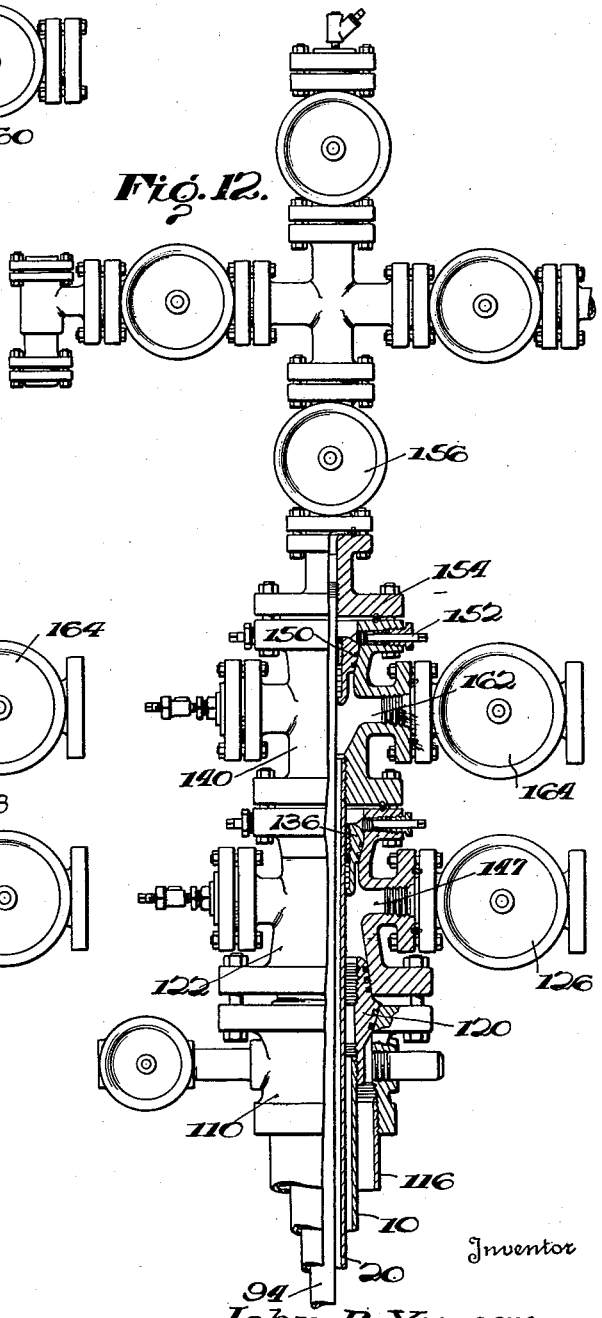
Inventor
John R. Yancey,
By Cushman Darby & Cushman
Attorneys Patented Mar. 24, 1942

2,277,380

UNITED STATES PATENT OFFICE 2,277,380

APPARATUS FOR PRODUCING WELLS

John R. Yancey, Houston, Tex., assignor to Gray Tool Company, Houston, Tex., a corporation of Texas Application November 30, 1939, Serial No. 306,984

16 Claims. (Cl. 166—2)

The present invention relates to an apparatus for establishing separate closed conduits of communication with a plurality of stratums of an oil well. The most important use of the invention is in establishing the said separate conduits of communication for purposes of flowing the well simultaneously from a plurality of stratums, or selectively from any one or more of them.

However, the invention may also be employed in establishing separate closed conduits of communication with a plurality of stratums of an oil well for purposes of injecting fluid under pressure into the stratums for use in stimulating the flow of adjacent wells. That is, it is now a known practice to apply pressure to the sands from one well in order to assist the flow from that particular sand in one or more adjacent wells. The present invention may be used thus for simultaneously applying pressure to a plurality of stratums, or selectively applying pressure to any one or more of them.

The invention accomplishes the above objects in a practical manner, in such fashion that the ordinary field operations which are required to be performed in a well, can be carried out, and yet the well may be so equipped that the separate conduits of communication referred to above are provided.

Therefore, a very important object of the invention is to accomplish the above objects in such manner that the steps performed in accomplishing this particular purpose do not interfere with the conventional steps of completing a well. The particular purposes of this invention are accomplished without sacrificing mechanical control of the well at any stage, and without tying up any of the control equipment permanently on the well.

As a part of the invention, one of applicant's objects is to provide a novel housing containing valves and seats which permits the accomplishment of the objectives of the preceding paragraphs in a simple yet effective manner.

A further object of the invention is to provide oil well super-structure equipment in the form of casing heads, tubing heads, tubing hangers, etc., which permits the accomplishment of the preceding objectives in a convenient manner and while maintaining complete mechanical control of the well.

In the drawings, which are illustrative of apparatus which may be used in practicing the invention and of one convenient manner in which the method of the invention may be carried out:

Figures 1 to 4 are vertical cross sectional views of an oil well casing extending through a plurality of stratums of a well, showing the tubing and equipment of the present invention attached thereto in various successive positions during the practice of the invention.

Figure 5 is an enlarged vertical sectional view of the valve housing which is attached to the tubing, showing the condition of the apparatus immediately prior to the opening of the valves carried in said housing.

Figure 6 is a view similar to Figure 5 showing a succeeding stage in the operations of the invention, with the valves in the housing opened.

Figures 7 through 12 are successive views of the condition of the equipment at the surface of the well during the performance of the operations illustrated in Figures 1 through 4.

Figure 13 is a partial vertical sectional view of the tubing head and stuffing box hanger, this view serving to illustrate the details of either hanger 136 or 150.

Figures 14, 15 and 16 are horizontal sectional views taken through the valve housing respectively on the lines 14—14, 15—15, and 16—16 of Figure 5.

Referring to Figure 1, S1 indicates an upper sand or stratum, and spaced below the same are other sands or stratums S2 and S3. These stratums are illustrated as being separated from one another by layers of any material which may be encountered in a well such as rock, shale, etc. It is a purpose of the invention to establish separate closed conduits of communication with these three stratums simultaneously, or selectively with any one or pair of them.

The well has a conventional casing 10 which lines the wall of the hole from the bottom thereof to the surface of the ground. While I have illustrated only one casing in Figure 1, it will be understood that this may be the innermost of a series of casings used to line the wall of the drilled hole, as is well known in the art. That is, the casing 10 may extend upwardly through one or more upper casings which were previously set and cemented during the drilling of the well. The casing 10 traverses the oil sands, and extends upwardly therefrom to the surface of the ground. It carries at the lower end thereof a conventional shoe 12 which is shown disposed just above the lower stratum S3, and is open through this shoe to the lower sand.

The casing is perforated at 16 and 18, respectively, opposite the upper stratums S1 and S2. As the casing does not extend through the lower sand S3, perforations there are unnecessary. The perforations provide communication with the various oil and gas sands. They may be located with precision opposite the desired sands after the casing is run in and cemented, by lowering a gun perforator into the casing and shooting the holes therethrough.

The flow tubing 20 is lowered down into the casing in the usual manner, and is equipped with spaced packers P1 and P2 of any conventional type, which packers are intended to form seals across the space surrounding the tubing and within the casing 10, to isolate the different stratums of the well from one another. The packers may be of the well known mechanical type including slip elements 22 on the tubing which are released by the bayonet slot and lug arrangement shown at 24 to provide a foundation for setting the packers, as is well known in the art. The lower open end of the tubing is equipped with a perforated section 26, through which fluid, such as oil from the lower stratum S3, may pass to the interior of the tubing.

I have coordinated the various elements described above with a novel valve housing H connected into the tubing 20 in such a manner as to accomplish the purposes of the invention as previously set forth.

Broadly, the housing H contains a back pressure valve which functions in the conventional way during the lowering of the tubing 20 into the well, as well as during the washing of the well, and a slide valve in the wall of the housing which may be opened to provide a channel of flow through said wall.

These two valves are so arranged that after the tubing is lowered into the well, and the packers positioned and set to separate the different stratums, a smaller pipe carrying a foot-piece may be lowered down through the tubing to cooperate with the elements carried by the housing in such manner as to open the back pressure valve so that a conduit of communication will be established from a stratum below the packer P2 through the smaller pipe, and to open the slide valve in the wall of the housing so that a conduit of communication will be established from the stratum above the packer P2 through the interior of the tubing 20 around the smaller pipe. At the same time, the parts of the housing are so arranged that they cooperate with the foot-piece on the lower end of the smaller pipe, to form a seal below the slide valve in the side wall of the housing, so that the channels of flow referred to above are isolated from one another.

The specific construction and manner of operation of the valves carried by the housing H are disclosed in Figs. 5 and 6. The housing comprises a tubular body 30 interiorly threaded at its upper end as at 32 to a collar 34 which in turn is interiorly threaded adjacent its upper end as at 36, where it connects with the lower end of an upper section of the tubing 20. The body 30 is also interiorly threaded at its lower end as at 38, and there connects with a collar 40 which is in turn interiorly threaded at its lower end as at 42, where it connects with the upper end of a lower section of the tubing 20.

Thus, the housing H which carries the valves to be presently described, is a self-contained unit which may be conveniently inserted between strings of an ordinary flow tubing in the usual manner as that tubing is being run into the well. It will be understood that the external diameter of the housing H is less than that of the conventional oil well tubing heads and control equipment, so that the housing may be manipulated into and from the well through said equipment while complete mechanical control of the well is maintained. While it is preferable that the valves and working parts employed to control the establishment of communication with the separate stratums should be a part of and carried by the housing H, it will be understood that some variation of the structure employed in practicing this invention may be made without departing therefrom, such as perhaps positioning some of the elements to be described in the flow tubing, rather than being positively connected with the housing H and its associated parts.

The top connecting collar 34 extends down into the body 30 in the form of a tapered depending tubular extension 46, and, as shown in Figure 6, the lower end of the extension 46 is provided with an accurately ground outside tapered seat 48 which is adapted to fit and form a seal with a cooperating accurately ground inside tapered seat 50 on the upper end of a slide valve member 52.

Similarly, and referring more particularly to Figure 5, the lower collar 40 has an upwardly directed extension 54 fitting within the lower end of the body 30, and at the upper end of this extension there is an inside accurately ground tapered seat 56 which cooperates and forms a seal with a similar accurately ground tapered seat 58 on the outside of the lower end of the slide 52.

The slide 52 comprises upper and lower cylindrical portions which, respectively, carry the seats 50 and 58, and between said portions there is an enlarged inside boss 64 which has a longitudinal bore 68 therethrough. The central boss 64 at the upper and lower ends of the bore 68 is provided with counter-sunk seats 70 and 72.

The lower seat 72 is intended to cooperate with the tapered end 74 of a back pressure valve, said valve being connected in any suitable manner, as by welding, with a head on the upper end of a valve stem 76. The valve stem is mounted for sliding movement in a ring-like spider 78 which is threaded in the lower collar 40 above where it connects with the lower section of tubing 20, and on the lower end of the valve stem 76 there is a retaining nut 80. The lower portion of the valve stem is of decreased diameter, and surrounding the reduction there is a spring 84 held at its ends between the spider 78 and a shoulder 86 near the upper end of the valve stem.

When the housing H and its associated parts are run into the well on a tubing, the slide 52 is maintained in its uppermost position, which is that shown in Figure 5. The slide is so held by the well pressure, which acts upon the exposed lower face 88 of the boss 64, and upon the lower end 89 of the valve member. When the slide is thus in its uppermost position, its upper tapered surface 50 engages the lower tapered surface 48 on the upper collar 34 to form a seal, and the valve member 74 is pressed against the seat 72 not only by well pressure, but also by the pressure of the spring 84. The slide 52 is circularly grooved on its outer wall and this groove is filled with a packing 90 to form a tight sliding fit with the bore of the body 30. Thus, the tubing is closed against upward flow of fluid under pressure from the well. However, the well can be washed in the usual manner, if it is mud laden, by forcing a lighter liquid downwardly through the tubing 20 at sufficient pressure to overcome the well pressure, in which case the valve 74 is moved downwardly from its seat permitting passage of the washing liquid downwardly through the housing H to the bottom of the tubing, and outwardly through the lower end thereof, thence passing upwardly through the casing and discharging through the appropriate side outlets in the casing head, in the usual manner. The washing liquid can flow freely around the outside of the head of the valve 74, as said valve is of outside diameter somewhat smaller than the inside diameter of the depending cylindrical portion of the slide 52. The head 74 of the valve carries circumferentially spaced guide lugs 91 between which the washing fluid may pass.

The tubular body 30 of the housing H has one or more ports P through its wall adjacent the upper end thereof. These ports are intended to provide a part of a closed conduit of communication from an upper sand or stratum S2 above the packer P2 (Figure 1), as will be presently described. The ports P are so arranged that when the slide 52 is moved downwardly to the position of Figure 6, they are exposed and communication is established from the space in the casing around the tubing above the packer P2 and the interior of the tubing 20. When the slide 52 is moved downwardly, the tapered outside seat 58 on its lower end engages and forms a seal with the tapered inside seat on the end of the upwardly extending portion 54 of the lower collar 40.

When the well is washed, with liquid forced downwardly through the tubing, the pressure thereof moves the valve 74 from its seat, but the slide 52 is mounted with sufficient friction in the barrel 30 so that it does not move downwardly to expose the ports P. The washing liquid passes the valve 74 and flows out of the lower end of the tubing at 26 adjacent the stratum S3, and upwardly through the casing 10 passing both packers P1 and P2 and washing the perforations 16 and 18. The parts could be arranged so that the slide moves downwardly during washing, and the washing operation would still be efficient, but it is preferred to pass all of the washing liquid out of the lower end of the tubing.

The back pressure valve 74 and the ports P in the wall of the body 30 of the housing H are opened by a tubular foot-piece F which is carried on the lower end of a smaller pipe 94 to which it is secured by means of a collar 96. The pipe 94 is sufficiently smaller than a tubing 20 to be passed downwardly therethrough with a foot-piece F on the lower end thereof. The lower end of the foot-piece has a flat head 98 which engages a flat upper end of the back pressure valve 74 and moves the valve downwardly against the pressure in the well and against that of the spring 84 until the valve is opened, as shown in Figure 6. The lower end of the foot-piece F is also equipped with several openings 100, which, when the foot-piece forces the valve 74 from its seat, are exposed below the seat 72 on the slide 52. Therefore, when the back pressure valve is moved from its seat, a conduit of communication is established from the stratum S3 below the packer P2 upwardly through the lower section of tubing 20, past the back pressure 74, thence through the openings 100 in the foot-piece F, and upwardly through the smaller pipe 94 to the surface of the well.

The foot-piece F also has a substantially centrally disposed outside boss 102 having a lower tapered surface 104 which may be faced with some sealing material, such as lead or packing, which surface is adapted to engage and form a seal with the upper seat 70 of the slide 52, at the time when the foot-piece F has moved the back pressure valve 74 from its seat. The seal formed by the face 104 and the seat 70 entirely separates the two closed conduits of communication, leading from the stratums above and below the packer P2, so that said conduits are entirely independent.

Therefore, when the housing H has been run into a well to the proper point, and a packer on the tubing below the ports P has been set after washing, if the latter operation is required, the foot-piece F is run into the well on the lower end of the smaller pipe. The foot-piece opens the back pressure valve and establishes a closed conduit of communication from the stratum below the packer through the smaller pipe, and substantially simultaneously depresses slide 52 to open the ports P while forming a seal between the smaller pipe and the bore of the housing H below said ports, so that there is a closed conduit of communication from the upper stratum leading to the interior of the tubing 20 around said smaller pipe.

When the foot-piece F moves the back pressure valve 74 downwardly from its seat, pressure is equalized on the slide 52, and it is easily moved to its lower position by the positive depressing force of the foot-piece F, which overcomes the frictional engagement of the slide with the barrel 30.

If, at any time, it is desired to remove the smaller pipe 94 from the well, and close the back pressure valve, all that need be done is to move said pipe upwardly until the foot-piece F permits the back pressure valve 74 to again engage its seat. The well pressure and that of the spring 84 will move the slide 52 upwardly until the ports P are closed. Thus, at any time, the simultaneously flowing of the well may be discontinued and the back pressure valve put back into operation to close off the tubing adjacent the lower end thereof.

Removal of the smaller pipe 94 is, therefore, not a pressure operation requiring control equipment at the surface of the well, for the valve 74 completely closes off the tubing 20 when the foot-piece F is moved therefrom.

The manner of running tubing equipped with this valve housing into a well to establish the separate conduits of communication is illustrated in Figures 1 through 4 and 7 through 12.

Figure 7 shows now conventional oil well superstructure equipment including a casing head 110 provided with appropriate side outlets closed by a bull plug 112 or controlled by a valve 114. The casing head 110 is connected with the upper end of the outer casing 116, which it will be understood is inserted into the well to line the first hole drilled, and is cemented in position in said hole. The well was further drilled through the casing 116 to receive the inner casing 10 which is disclosed in Figures 1 through 4. The inner casing 10 is hung in the casing head 110 by a combined hanger and seal 120 after which a tubing head 122 is mounted on the casing head to support the tubing, said tubing head forming a seal around the hanger 120. The tubing head is shown bolted by a lower flange to the upper flange of the casing head 110, as is now well known in the art. The general construction of this well super-structure equipment is illustrated in the patent to Smith et al., No. 2,148,327, February 21, 1939. The tubing head 122 is also equipped with side outlets which may be plugged on one side for a pressure gauge, as shown at 124, and provided on the other side with an outlet controlled by a valve 126. The top of the tubing head is provided with the usual pressure-proof locking screws 128 to hold the tubing hanger down as is now well known in the art.

Mounted above the tubing head is any suitable control equipment, such as a full opening master drilling valve 130 and any well known type of full opening blowout preventer 132. Two spaced blowout preventers may be used, if desired. The bore through this control equipment is at least as large as that of the casing 10 so that all of the necessary operations requiring the full bore of the casing may be carried on as the well is completed, while maintaining mechanical control.

After the "drilling in" operation has been performed through the casing 10 and into the lower sand S3 (Figure 1), the drill is removed preparatory to inserting the tubing 20, as shown in Figure 7. Before running the tubing, the casing 10 may be perforated as at 16 and 18 by lowering a gun perforator into the well through the control equipment and then removing same while control is maintained. The well may or may not be filled with mud at this time, depending on circumstances. If convenient, the blowout preventer 132 may be mounted above a full opening tubular connector 134 provided, if necessary, with appropriate side outlets, although this connector is not essential.

It will be understood that when the tubing is to be run, the drill pipe will have been removed and the master drilling valve 130 will be closed. The tubing is passed through the blowout preventer 132, and a seal is formed around the tubing before the valve 130 is opened. If desired, two blowout preventers may be used, as described in Patent No. 2,148,327, previously referred to.

The tubing 20 is run into the well with the perforated section 26 (Figure 1) attached to the lower end thereof, and when the section of the tubing which is to be opposite the intermediate stratum S2 is positioned above the control equipment, the housing H carrying the valves previously described is connected into the tubing. The tubing is then lowered away with the housing H as a section thereof, and until the housing reaches a point adjacent the stratum S2. At this time, and as the section of tubing 135 is being threaded into the string, a tubular stuffing box type hanger 136 is passed up around the tubing section 135 just before said section is connected with the section of tubing below, and this hanger is moved upwardly until it engages the next regular tubing collar 138.

The hanger 136 is of well known construction, having a tapered seat shaped to fit in and form a seal with the tapered seat of the tubing head 122, and said hanger is adapted to be secured in said tubing head by the locking screws 188. The interior of the hanger is equipped with a stuffing box as shown in Figure 13, so that the tubing may slide with respect to the hanger and yet maintain a seal therewith. The hanger 136 is lowered with the tubing through the control equipment and landed and locked in the seat of the tubing head 122.

At the time the hanger 136 is initially landed in the tubing head 122 as shown in Figure 8, the packers P1 and P2 have not yet been set (see Figure 1), and the control device 24 for the slips 22 on the tubing has not been released to permit anchoring the slips so that the packers can be expanded.

After the hanger 136 is seated and locked, the control equipment, including the master drilling valve 130 and the blowout preventer 132, may be removed, for the well is under complete mechanical control. That is, the back pressure valve in the housing H closes off the tubing against upward flow, while the hanger seated in the tubing head forms a seal in the space between the tubing and the casing.

It will be understood that while the tubing was being lowered into the well, as previously described, it was possible to circulate mud through the well past the back pressure valve in the housing H at any time such circulation was needed. If desired, the well could be washed with the control equipment in place, better before but permissibly after the landing of the hanger 136. However, it is preferable to wash the well in this completion after the control equipment is removed, as described below.

In lieu of the stuffing box hanger, a regular screw threaded solid hanger may be used in the tubing 20, as shown in Figure 7 of Patent No. 2,150,887, March 14, 1939. Such a solid hanger could be secured into the tubing and the well washed with the control equipment in place and the blowout preventer forming a seal around the tubing, after which the tubing could be lowered to expand the packers and land the hanger in the seat of the tubing head 122, the parts being so arranged that the hanger just seats when the packers are expanded.

When the hanger 136 has been seated, a second similar but smaller bored tubing head 140 is secured at the proper point to the tubing, as by threads 142, and the tubing is kept elevated a sufficient distance to permit subsequent setting of the packers and simultaneously locating the housing H opposite the casing perforations 18. It is well known in the art that a certain downward movement of the tubing is required to set packers after the slips 22 are released (see Figure 1). Another master valve 144 is connected to the upper end of the tubing head 140 and a lowering nipple 146 may be suitably attached to the upper end of valve 144 so that the equipment may be conveniently suspended in the derrick and manipulated therein. The valve 144 should have a bore at least as large as that of the tubing 20 to permit any operations through said tubing. While the back pressure valve in the housing 20 permits necessary control through the tubing during the washing operation, the valve 144 may be used as an added precaution to permit closing off the tubing in case of necessity, or to shut off the downward flow of the washing fluid when desired. If the back pressure valve should become disabled, the valve 144 would be in place, blowout preventers could be mounted above it, and the smaller pipe run in through them under pressure and its hanger 150 landed in the tubing head 140, the control equipment previously referred to being then replaced as shown in Figure 12 with the Christmas tree, while providing any well known control means, such as a spear plug, within the smaller pipe.

Washing is accomplished by pumping a lighter liquid, such as water, downwardly through the tubing 20 and outwardly through the perforations in the nipple 26. This liquid displaces the mud, which passes upwardly through the casing 10 and discharges through the side outlet 147 in the tubing head 122.

If a solid type hanger were used in lieu of the stuffing box hanger 136 on the tubing 20, the washing would have been performed with the control equipment in place, as previously described, and after turning and lowering the tubing to land the hanger and removing the control equipment, the second tubing head would be immediately bolted onto the first tubing head 122, and the smaller pipe 94 carrying the foot-piece F would be run through both tubing heads. In this case, before the foot-piece F reached the housing H, to open the back pressure valve, a smaller stuffing box hanger fitting the pipe 94 would be placed thereon, and landed and locked in the seat of the second tubing head 140, to provide control around the pipe 94 after the back pressure valve was opened.

Returning to the method illustrated in the drawings, when the washing has proceeded to the point where the returns from the well indicate that the well is "kicking," or the formation pressure is overcoming the head of fluid in the well, the tubing is manipulated as by being rotated to release the slip control device 24 (Figure 1) after which the tubing is lowered to expand the slips 22 and providing a foundation for anchoring the packers. The tubing is then further lowered until the packers P1 and P2 are expanded to form seals in the space between the tubing 20 and the casing 10 respectively above and below the intermediate stratum S2.

Operators are able to manipulate tubing in such conventional operations as setting packers so that when the packers are completely expanded, the second tubing head 140 engages the upper flange of the first tubing head 122, as shown in Figure 10. At this time, the two tubing heads are bolted together, as shown, after which the master valve 144 may be removed and with it everything above the tubing head 140. It will be understood that the well is still under mechanical control, closed up outside the tubing 20 by the hanger 136, and inside the tubing by the back pressure valve in the housing H.

When the tubing head 140 is seated on the lower tubing head 142 as shown in Figure 10, the ports P through the wall of the housing H are opposite the perforations 18 in the casing at the stratum S2.

The well is now ready to have closed conduits of communication established both above and below the packer P2 from the stratums S2 and S3 respectively, and these conduits of communication are established by lowering the smaller pipe 94 with its foot-piece F into the well to open the back pressure valve 74 and the ports P in the manner described in connection with Figures 5 and 6. The opening of the back pressure valve establishes a closed conduit of communication from the lower stratum S3 through the perforated end 26 of the tubing 20, thence upwardly into the smaller pipe 94 to the surface of the well. At the same time, opening of the ports P establishes the closed conduit of communication from the upper stratum S2 to the interior of the tubing 20 above the seal formed by the engagement of the foot-piece valve member 104 with the slide seat 70, this conduit leading upwardly through the tubing around the exterior of the smaller pipe 94 to the surface of the well. As shown in Figure 2, these conduits of communication are isolated from one another by the seal of the expanded packer P2 in the space between the tubing 20 and the casing 10. They are also isolated from one another within the tubing 20, that is, within the housing H, by the seating of the foot-piece valve on the valve of the slide, as previously referred to.

The manner in which the smaller pipe 94 is run into the well is illustrated in Figures 11 and 12. This pipe is passed downwardly through the tubing heads 140 and 122 and through the tubing 20. Sections of this smaller pipe are connected with one another above the upper tubing head as the pipe is lowered into the well in the usual manner. When the foot-piece F has reached a point in the tubing 20 adjacent to and above the housing H, a second and smaller stuffing box tubing hanger 150 is passed upwardly over the lower end of the particular section of pipe 94. This stuffing box hanger is identical with but smaller than the stuffing box hanger 136 shown in Figures 7 and 8. The hanger is lowered with the pipe 94 into the conventional hanger seat of the tubing head 140, and locked therein by means of locking screws 152 similar to the locking screws 128 shown in Figure 7. At this time, the lower end of the pipe 94 carrying the foot-piece F, as shown in Figure 3, is lowered to position just above the slide 52 in the housing H, as shown in Figure 3. A tubular adapter 154 is then secured as by threads to the upper end of the last section of tubing 94 at a distance above the top of the tubing head 104 equal to the distance the foot-piece F is above the point where it will finally be located after it moves the slide 52 downwardly and opens the back pressure valve 74 as shown in Figure 6. At this time, a Christmas tree may be attached to the adapter 154 as shown in Figure 11, and this Christmas tree may be of any usual type, including a relatively small master manifold valve 156, a cross 158 mounted above the same, and various control valves 160 attached to said cross. It will be understood, of course, that the Christmas tree need not be attached at this time, but as Christmas trees are usually sold as a unitary combination of valves and fitting, it is more convenient to stab the tree onto the pipe as a unit, and then lower it with the tubing.

With the Christmas tree attached as shown in Figure 11, the smaller pipe 94 is lowered until the foot-piece F moves the slide 52 downwardly until the ports P are exposed as shown in Figure 4, and until the back pressure valve 74 is moved from its seat with the foot-piece forming a seal above said valve with the seat 70 of the slide 52, and with the end openings 100 in the foot-piece exposed below the back pressure valve seat 72, as shown in Figure 6. At this time, the adapter 154 engages the upper end of the tubing head 140, and is then bolted thereto.

Closed conduits of communication are thus established from the lower stratum S3 upwardly through the smaller pipe 94 and from the upper stratum S2 upwardly through the interior of the tubing 20. The lower stratum may then flow under natural formation pressure through the pipe 94 under control of the Christmas tree including the master manifold valve 156. The upper stratum S2 may be flowed under natural formation pressure from the tubing 20 outwardly through the side outlet 162 of the tubing head 140 under control of the valve 164.

Referring to Figure 4, it will be observed that the packer P1 has been set or expanded against the inner wall of the casing 10 below the upper sand S1, the casing 10 having been previously perforated in alignment with the stratum S1 at

10. Therefore, the seating of the packer P1, separating as it does the upper stratum S1 from the intermediate stratum S2 in the space within the casing 10, isolates a third closed conduit of communication from the upper stratum S1 through the casing 10 on the outside of the tubing 20. If the well is being flowed, production may be had through this third conduit of communication, discharging, for instance, through the side outlet 147 in the lower tubing head 122 under the control of the valve 126.

The manipulation of the equipment has been described particularly with reference to the flowing or producing of a single well under its natural formation pressure. This is the principal use of the invention, and the equipment disclosed has been designed with the idea in mind that the necessary practical operations required in completing all wells may be performed and the well then completed practicing the present invention to flow simultaneously or independently from the plurality of stratums of a well. That is, the equipment and procedure described above lends itself to convenient incorporation in the now accepted sequence of oil well completion operations.

However, it will be apparent that the closed conduits of communication may be established with the separate stratums for other purposes. Particularly, these closed conduits may be useful in stimulating wells adjacent to that one in which the equipment previously described was mounted. Fluid may be pumped downwardly through the separate conduits of communication into the respective sands causing flow therefrom in adjacent wells. All of these closed conduits of communication may be used simultaneously to flow adjacent wells from all three stratums or any one or pair of the conduits may be selectively operated for this purpose. Furthermore, a well equipped with the apparatus of this invention may be flowed under natural pressure from one or more stratums through one or more of the closed conduits of communication, while pressure may be induced into one or more of the other stratums through one or more of the other closed conduits of communication. Thus the well may be acting as a producer at the same time as it is operated to stimulate adjacent wells.

This invention is also useful in simultaneously flowing oil and gas from the same well. For instance, the formation penetrated may have gas in the stratum S1 and perhaps different types of oil in the stratums S2 and S3. All three products may be thus simultaneously flowed but independently of one another. Furthermore, gas may be produced from any one of the stratums while oil is being produced from the others, and this gas may be piped to adjacent wells which are dead, for use in the gas lift method of production.

Figure 13 illustrates the details of construction of either the hanger 136 or 150. It has a central bore 161 somewhat larger than the pipe to which it is fitted, said bore terminating short of the bottom of the hanger, where there is an opening 163 from the bore to the bottom of the hanger only slightly larger than the pipe on which the hanger is mounted. The bore carries a number of circular packing rings 165, which are compressed by a tubular follower 167 threaded into the upper end of the bore, the follower having any convenient provision to receive a wrench to tighten the packing, or to loosen or remove it. The upper outer edge of the hanger is tapered to receive the tapered inner ends of the pressure-proof locking screws. The surface of the hanger which seats in the tubing head is grooved and provided with the usual sealing rings.

In Figure 1, the tubing is shown being lowered into the well, the packers not being expanded. In Figure 2, the housing H has reached the desired location opposite stratum S2, and the lug of the slip setting device 24 has been moved into the vertical groove of the bayonet slot. The slips 22 are held by wall engaging springs as shown, and downward movement of the tubing expands the slips and then expands packers P1 and P2 in the usual manner, as shown in Figure 2.

The equipment remains in the condition of Figure 2 thereafter, Figures 3 and 4 showing the operation of the valves in the housing H, it being understood that the lower end of tubing 20, including packer P2 and the slips, is omitted in Figures 3 and 4 for simplicity.

Applicant has not disclosed the details of the packer setting devices, as the structure and operation of these devices are well known in the art. The type of packer illustrated in Figures 1 and 2 is the hook-wall type, the foundation for setting the packers being provided by engagement of the slips 22 with the inner wall of the casing 10.

Almost all manufacturers of packers at the present time provide tables giving the amount of movement required to completely collapse the packer. With such information available, and referring for instance to Figure 9, the operator would be able to space the flange of the tubing head 140 from the flange of the head 122 a distance corresponding with that required to completely collapse the packers P1 and P2. With the two heads properly spaced, the lug of the releasing device 24 is moved into the vertical slot of said device, and as the tubing head 140 is further lowered, both of the packers are completely collapsed as the flanges of the two heads come together. This is all well known in the art. In the case of deep wells, the amount of stretch in the tubing, which is also available in the form of tables, would be added to the amount of collapse required to expand the packers, so as to have the full weight of the tubing on the packers at the time the flanges of the tubing heads come together.

It will be understood that various changes in the apparatus and methods disclosed herein may be made without departing from the invention. Furthermore, the apparatus is capable of other uses than those described herein, without departing from the invention.

For instance, while the drawings disclose the casing 10 passing through two sands, and terminating above the lower sand, this relation of the casing with respect to the tubing and valve housing is not essential in order to practice the invention. The invention can be practiced where the casing passes through all of the producing zones or sands, and is perforated at each of the three sands in question. Furthermore, the invention may be practiced where the casing terminates above the sands, leaving an open hole at the producing zones, it being obvious to one skilled in the art that conventional formation packers could be used under such circumstances to separate the different sands. To illustrate that the relationship between the tubing and casing disclosed in the drawings is an example of only one relative arrangement in which the invention may be practiced, it can be seen that this method and apparatus could be employed if the casing is set above the lower sands S2 and S3, with the casing perforated at the upper sand S1. Referring to Figure 1, if the casing shoe 12 is positioned between stratums S1 and S2, the packer P2 could be any conventional formation packer which would form a seal against the wall of the open hole below the shoe 12, thus separating stratums S2 and S3. A foundation for these formation packers is provided by permitting the lower end of the tubing to rest on the bottom of the hole, after which downward movement of the tubing above the packer would collapse the same. In the particular situation under discussion, the upper packer P1 being below the upper sand S1, could be designed to form a seal with the inner wall of the casing 10.

It is again to be understood, as illustrated above, that the invention adapts itself in various ways to use with conventional oil well equipment, and various situations and conditions encountered at the particular well.

I claim:

1. Apparatus for establishing closed conduits of communication with different stratums of a well, comprising a tubular housing adapted for attachment in a tubing to be lowered into the well thereby to the level of an upper stratum, said housing having a port through its wall and a valve member for closing said port, said valve member being constructed and arranged to be moved by a smaller pipe lowered into the tubing to open said port, and means carried by said valve member for forming a seal between the open end of the pipe and the inner wall of said housing below said port, whereby a closed conduit of communication is established extending upwardly through the tubing from the upper stratum through said port, and a second closed conduit of communication is provided extending upwardly through the pipe from a lower stratum.

2. Apparatus for establishing closed conduits of communication with different stratums of a well, comprising a tubular housing adapted for attachment in a tubing to be lowered into the well thereby to the level of an upper stratum, said housing having a port through its wall and means for closing said port, and a tubular foot-piece open at its lower end and adapted for attachment with a smaller pipe to be lowered into the tubing, said foot-piece being operable to open said port, and having means for forming a seal between the opening in said foot-piece and the inner wall of said housing below said port, whereby a closed conduit of communication is established extending upwardly through the tubing from the upper stratum through said port, and a second closed conduit of communication is provided extending upwardly through the pipe from a lower stratum through said tubular foot-piece.

3. Apparatus for establishing closed conduits of communication with different stratums of a well, comprising a tubular housing adapted for attachment in a tubing to be lowered into the well thereby to the level of an upper stratum, said housing having a port through its wall and means for closing said port, a back pressure valve in said housing below said port for closing said tubing against upward flow therethrough from a lower stratum of the well, said means being constructed and arranged to be moved by a smaller pipe lowered into the tubing to open said port, said back pressure valve also being adapted to be moved by the lower end of said pipe to open the same, and means on said pipe for forming a seal between the same and the inner wall of said housing below said port, whereby a closed conduit of communication is established extending upwardly through the tubing from the upper stratum through said port, and a closed conduit of communication is provided extending upwardly through the pipe from a lower stratum.

4. Apparatus for establishing closed conduits of communication with different stratums of a well, comprising a tubular housing adapted for attachment in a tubing to be lowered into the well thereby to the level of an upper stratum, said housing having a port through its wall and means for closing said port, a back pressure valve in said housing below said port for closing said tubing against upward flow therethrough from a lower stratum of the well, and a hollow foot-piece adapted for attachment with a smaller pipe to be lowered into the tubing, said foot-piece being operable to open said port and said back pressure valve, and having means for forming a seal between the pipe and the inner wall of said housing below said port, whereby a closed conduit of communication is established extending upwardly through the tubing from the upper stratum through said port, and a closed conduit of communication is provided extending upwardly through the pipe from a lower stratum through said tubular foot-piece.

5. Apparatus for establishing a conduit of communication with a selected stratum of a well, comprising a tubular housing adapted for attachment in a tubing to be lowered into the well thereby to the level of the stratum, said housing having a port through its wall, a tubular sleeve adapted for slidable sealing movement in said housing to open and close said port, said sleeve having a seat, and a foot-piece adapted for attachment with a smaller pipe to be lowered into the tubing, said foot-piece being operable to engage said sleeve to move the same longitudinally in said housing to open said port, and having means to engage said seat and form a seal between the outer wall of the smaller pipe and the inner wall of the housing below said port.

6. Apparatus for establishing closed conduits of communication with different stratums of a well, comprising a tubular housing adapted for attachment in a tubing to be lowered into the well thereby to the level of an upper stratum, said housing having a port through its wall, a tubular sleeve mounted for longitudinal movement in said housing to open and close said port, said sleeve having an inside seat, and a tubular foot-piece open at its lower end and adapted for attachment with a smaller pipe to be lowered into the tubing, said foot-piece being adapted to cause longitudinal movement of said sleeve in said housing to open said port, and having a lower end adapted to pass through said seat to establish communication between the interior of the smaller pipe and the tubing below said seat, said foot-piece having means to engage and form a seal with said seat and thereby with the inner wall of said housing below said port, whereby a closed conduit of communication is established extending upwardly through the tubing from the upper stratum through said port, and a second closed conduit of communication is provided extending upwardly through the pipe from a lower stratum through said tubular foot-piece.

7. In a device of the character described, a tubular housing adapted to be connected in an oil well tubing, said housing having a port through the side wall thereof, a hollow valve sleeve carried by and adapted to be depressed in said housing below said port to expose the same, said sleeve forming a seal with the inner wall of said housing and having a lower valve seat to receive a back pressure valve to close the passage through said sleeve, said sleeve having an upper seat to receive and form a seal with the outer wall of a hollow foot-piece on the lower end of a smaller pipe passed downwardly through the tubing to depress said sleeve to expose said port and open the back pressure valve.

8. In a device of the character described, a tubular housing adapted to be connected in an oil well tubing, said housing having a port through the side wall thereof, a hollow sleeve carried by and adapted to be depressed in said housing below said port to expose the same, said sleeve forming a seal with the inner wall of said housing and having a lower valve seat to receive a back pressure valve carried by said housing to close the passage through said sleeve, said sleeve having an upper seat to receive and form a seal with a hollow foot-piece on the lower end of a smaller pipe passed downwardly through the tubing to depress said sleeve to expose said port and open the back pressure valve, said sleeve and back pressure valve being arranged in said housing to close said port and the passage through said sleeve, when the smaller pipe is withdrawn from the tubing.

9. Apparatus for establishing closed conduits of communication with different stratums of a well equipped with a casing head and casing having a perforated section at an upper stratum of the well, comprising a tubular housing adapted for attachment in a tubing having a packer thereon to separate the upper and lower stratums of the well, said housing being adapted to be lowered into the casing on the tubing to the level of the perforations in the casing, said housing having a port through the wall thereof, means in said housing cooperating with the lower end of a smaller pipe adapted to be inserted through the tubing to open said port and form a seal between the outside of the smaller pipe and the inner wall of said housing below said port, whereby communication is established with a lower stratum through the smaller pipe, and with the upper stratum from the perforations in the casing through said port and the interior of the tubing around the smaller pipe.

10. Apparatus for establishing a plurality of conduits for flow from a well equipped with a casing head and casing with a perforated section above the lower end thereof, a tubular housing adapted for attachment in a tubing to be lowered into the casing to the level of the perforations therein, said housing having a port through the wall thereof, a tubing hanger adapted to be placed around the tubing to form a seal between the same and the casing head, means in said housing cooperating with the lower end of a smaller pipe adapted to be inserted through the tubing, to open said port and form a seal between the outside of the smaller pipe and the inner wall of said housing below said port, a tubing head adapted to be mounted on and above said casing head, and a smaller tubing hanger adapted to be placed around the smaller pipe to form a seal between the same and said tubing head, whereby the well may flow from the perforations in the casing through said port and upwardly through the tubing, and upwardly from the casing through the smaller pipe.

11. Apparatus for establishing separate closed conduits of flow with a plurality of stratums of a well equipped with a flow tubing having means for forming a seal between upper and lower stratums of the well, comprising means to control flow from each stratum adjacent the lower end of the tubing operable by engagement with a smaller pipe lowered into the tubing for forming a closed conduit of flow with one stratum through the smaller pipe and for forming a separate closed conduit of flow with another stratum through the tubing around the smaller pipe, said control means being automatically operable to close the tubing against flow therethrough from the upper and lower stratums of the well when the smaller pipe is elevated from engagement therewith.

12. Apparatus for establishing separate closed conduits of flow with a plurality of stratums of a well equipped with a flow tubing having means for forming a seal between upper and lower stratums of the well, comprising a control assembly on the tubing adjacent the lower end thereof adapted for independently closing the tubing against flow therethrough from the upper and lower stratums of the well, said assembly being constructed and arranged for operation by engagement with a smaller pipe lowered into the tubing, and having means cooperating with the smaller pipe adjacent the lower end of the latter for forming a closed conduit of flow with one stratum through the smaller pipe and a separate closed conduit of flow with another stratum through the tubing around the smaller pipe.

13. Apparatus for establishing separate closed conduits of flow with a plurality of stratums of a well equipped with a flow tubing having means for forming a seal between upper and lower stratums of the well, comprising a control assembly adjacent the lower end of the tubing providing passages into the interior thereof through the bottom of the tubing and through the side wall thereof, and having means for closing said passages against flow through the tubing from the stratums of the well, said assembly being constructed and arranged for operation by engagement with a smaller pipe lowered into the tubing, said means cooperating with the smaller pipe adjacent the lower end of the latter for opening said passages to form a closed conduit of flow with one stratum through the smaller pipe and a separate closed conduit of flow with another stratum through the tubing around the smaller pipe.

14. Apparatus for establishing separate closed conduits of flow with a plurality of stratums of a well equipped with a flow tubing having means for forming a seal between upper and lower stratums of the well, comprising a control assembly adjacent the lower end of the tubing providing passages into the interior thereof through the bottom of the tubing and through the side wall thereof, and having means for closing said passages against flow through the tubing from the stratums of the well, said assembly being constructed and arranged for operation by engagement with a smaller pipe lowered into the tubing, said means cooperating with the smaller pipe adjacent the lower end of the latter for opening said passages to form a closed conduit of flow with one stratum through the smaller pipe and a separate closed conduit of flow with another stratum through the tubing around the smaller pipe, said means being automatically operable to again close said passages when the smaller pipe is elevated from engagement therewith.

15. In apparatus for establishing separate closed conduits of flow with a plurality of stratums of a well, a tubing adapted to be lowered into the well having a pair of openings therein and means to close said openings against upward flow through the tubing as the same is being lowered into the well, means for forming a seal between the tubing and the wall of the well between separate stratums, and a smaller pipe adapted to be lowered into the tubing, said smaller pipe cooperating with said closure means to open separate closed conduits of flow through said openings respectively, a conduit of flow from one opening including the interior of the smaller pipe, and a conduit of flow from the other opening including the interior of the tubing around the smaller pipe.

16. In apparatus for establishing separate conduits of flow with a plurality of stratums of a well equipped with a tubing, means adjacent the lower end of the tubing for closing the same against upward flow therethrough as the tubing is lowered into the well, a tubing head having an outlet for flow from the tubing, a smaller pipe adapted to be lowered into the tubing having means adjacent the lower end thereof cooperating with said tubing closure means for opening separate conduits of flow through the smaller pipe and through the tubing around the smaller pipe, and means on said tubing head above said outlet for forming a seal between the tubing and the smaller pipe when the latter opens said conduits of flow.

JOHN R. YANCEY.